United States Patent
Becker et al.

(10) Patent No.: US 10,026,387 B2
(45) Date of Patent: Jul. 17, 2018

(54) SOUND ABSORBING SANDWICH PLATE

(71) Applicant: FAIST ChemTec GmbH, Worms (DE)

(72) Inventors: Jean-Georges Becker, Worms (DE); Christian Hardt, Kelsterbach (DE); Bernd Lieutenant, Baldringen (DE)

(73) Assignee: FAIST CHEMTECH GMBH, Worms (DE)

( * ) Notice: Subject to any disclaimer, the term of this patent is extended or adjusted under 35 U.S.C. 154(b) by 0 days.

(21) Appl. No.: 14/555,002

(22) Filed: Nov. 26, 2014

(65) Prior Publication Data
US 2015/0144421 A1 May 28, 2015

(30) Foreign Application Priority Data
Nov. 26, 2013 (DE) .......................... 10 2013 224 145

(51) Int. Cl.
| | | |
|---|---|---|
| *G10K 11/16* | (2006.01) | |
| *B60R 13/08* | (2006.01) | |
| *B32B 5/02* | (2006.01) | |
| *B32B 5/26* | (2006.01) | |
| *G10K 11/168* | (2006.01) | |
| *B32B 5/00* | (2006.01) | |
| *B32B 5/22* | (2006.01) | |

(Continued)

(52) U.S. Cl.
CPC ............... *G10K 11/16* (2013.01); *B32B 5/00* (2013.01); *B32B 5/02* (2013.01); *B32B 5/022* (2013.01); *B32B 5/22* (2013.01); *B32B 5/26* (2013.01); *B32B 7/02* (2013.01); *B32B 7/12* (2013.01); *B32B 9/00* (2013.01); *B32B 9/04* (2013.01); *B60R 13/08* (2013.01); *G10K 11/168* (2013.01); *B32B 2250/40* (2013.01); *B32B 2307/10* (2013.01); *B32B 2307/102* (2013.01); *B32B 2307/30* (2013.01); *B32B 2307/304* (2013.01); *B32B 2419/00* (2013.01); *B32B 2605/00* (2013.01)

(58) Field of Classification Search
CPC ....... G10K 11/16; G10K 11/168; B60R 13/08
USPC .......................................... 181/290, 294, 295
See application file for complete search history.

(56) References Cited

U.S. PATENT DOCUMENTS 4,744,189 A * 5/1988 Wilson ...................... B44C 1/28
                                                                40/908
5,845,375 A * 12/1998 Miller ................ A41D 13/1161
                                                                24/452

(Continued)

FOREIGN PATENT DOCUMENTS

| AT | 508797 | 4/2011 |
|---|---|---|
| DE | 3416511 | 11/1985 |

(Continued)

OTHER PUBLICATIONS

English translation of DE 3416511 A1, <http://translationportal.epo.org/emtp/translate/?ACTION=description-retrieval&COUNTRY=DE&ENGINE=google&FORMAT=docdb&KIND=A1&LOCALE=en_EP&NUMBER=3416511&OPS=ops.epo.org/3.1&SRCLANG=de&TRGLANG=en>, accessed Sep. 4, 2015.*

*Primary Examiner* — Jeremy Luks
(74) *Attorney, Agent, or Firm* — Price Heneveld LLP

(57) ABSTRACT

A sound absorbing sandwich plate for attaching to a component includes a first layer and a second layer connected to the first layer in an areal manner characterized in that, at least partially, especially along the second layer at least an area-shaped mounting part is provided, which at its side facing the second layer has a plurality of engaging elements, which are engageable into the second layer.

17 Claims, 1 Drawing Sheet

(51) Int. Cl.
  *B32B 7/02* (2006.01)
  *B32B 7/12* (2006.01)
  *B32B 9/00* (2006.01)
  *B32B 9/04* (2006.01)

(56) References Cited

U.S. PATENT DOCUMENTS

| | | | | |
|---|---|---|---|---|
| 5,876,826 | A * | 3/1999 | Hoffmann | B60N 3/042 |
| | | | | 156/72 |
| 7,399,184 | B2 * | 7/2008 | Hester | B43L 1/00 |
| | | | | 434/408 |
| 2008/0001431 | A1 * | 1/2008 | Thompson | B32B 5/26 |
| | | | | 296/187.01 |
| 2008/0230309 | A1 * | 9/2008 | Fox | B32B 5/26 |
| | | | | 181/286 |
| 2009/0233045 | A1 * | 9/2009 | Slama | B29C 43/222 |
| | | | | 428/131 |
| 2012/0012420 | A1 * | 1/2012 | Classen | A47L 15/4246 |
| | | | | 181/294 |
| 2012/0013228 | A1 * | 1/2012 | Fritz | A47L 15/4246 |
| | | | | 312/228 |
| 2012/0155688 | A1 * | 6/2012 | Wilson | H04R 7/26 |
| | | | | 381/354 |
| 2013/0112499 | A1 * | 5/2013 | Kitchen | B32B 5/26 |
| | | | | 181/296 |

FOREIGN PATENT DOCUMENTS

| | | |
|---|---|---|
| DE | 19512582 | 10/1995 |
| DE | 102007044875 | 4/2009 |

\* cited by examiner

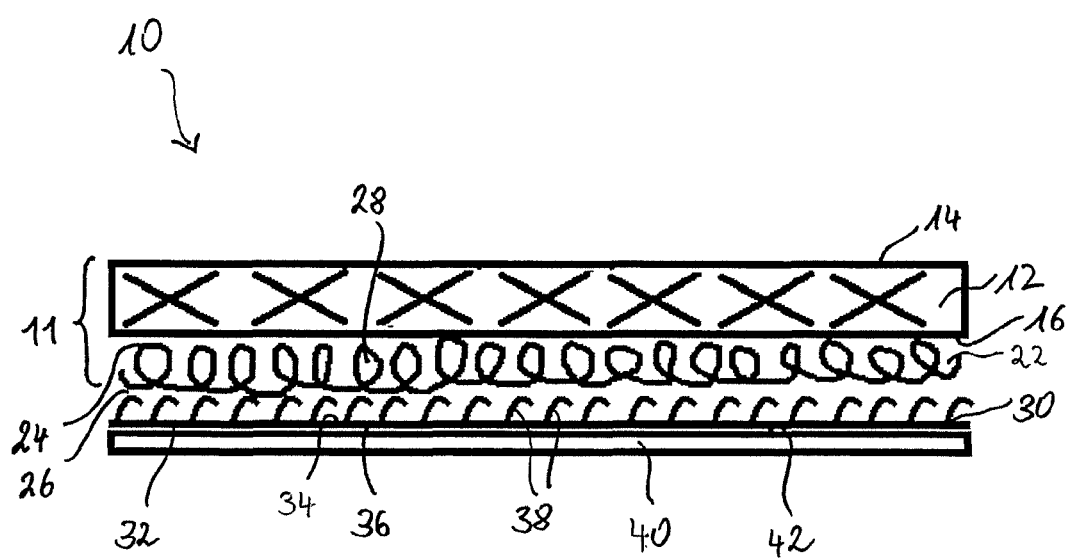

SOUND ABSORBING SANDWICH PLATE

BACKGROUND OF THE INVENTION

The invention relates to a sound absorbing sandwich plate for attaching to a component.

Sandwich plates of the above-mentioned type, which may also be referred to as sound insulating sandwich plates are basically known. They are especially used for improving the acoustic properties of a component, specifically for sound deadening (anti drumming) and/or sound insulation of a metal sheet. Sound absorbing sandwich plates are for example used for sound dampening and sound deadening, respectively, of a vehicle metal sheet or the wall of a household appliance. For this, the sandwich plates are generally bonded to the respective component in an areal manner.

In the field of both vehicles and appliances, besides good sound insulation and sound deadening, respectively, good thermal insulation is more and more asked for. Good thermal insulation especially allows efficiency improvement of electrical appliances, for example washing machines and dish washers. For dish washers, a known approach to increase energy efficiency is to partially sacrifice known sound deadening plates, and specifically to sacrifice a bitumen heavy foil, which usually is provided, and to eventually replace it by a thermal insulating layer. However, by sacrificing the sound deadening layer the acoustic properties of the appliance will be reduced.

The object of the invention is to provide a sound absorbing sandwich plate combining good thermal properties with efficient sound insulation or sound dampening (sound absorption).

SUMMARY OF THE INVENTION

According to the invention, the sound absorbing sandwich plate (sound dampening sandwich panel/plate) has a first layer and a second layer, which is connected to the first layer, in particular in an areal (full area) manner. At least partially, and in particular in an areal manner, along the second layer, there is provided at least one mounting part comprising a plurality of engaging elements, which are engageable into or with the second layer and which in particular project into the second layer. A form-fitting connection between the mounting part and the second layer is produced by the engaging elements engaging into the second layer.

The mounting part is in particular provided for mounting a plate part of the sandwich plate, comprising the first and the second layer, to the component to be acoustically improved. For this, the mounting part is on the one hand mounted to the second layer, namely by engaging the engaging elements into the second layer, and on the other hand is mounted to the component to be acoustically improved. Consequently, the mounting part forms an intermediate layer between the plate part of the sandwich plate and the component, wherein the intermediate layer may also be referred to as a third layer. The connection between mounting part and the plate part is of mechanical, in particular non-adhesive and/or detachable nature.

Contrary to the general teachings, that, for efficient sound deadening, a sound deadening plate such as a sandwich plate consisting of layers, which are firmly connected to each other, is to be bonded to the component in entire-area manner, it has surprisingly been shown that excellent combination of thermal and sound dampening properties are also allowed to be attained by form-fittingly connecting the second layer, which especially and essentially is for thermal insulation, to a mounting part, which is attachable to the component. This may be explained by the fact that with the area-shaped (sheet-like) mounting part having the individual engaging or form-fitting elements, which project into the second layer, a lower area density is allowed to be attained with the same thickness than with bonding the second layer to the component. In this way, thermal insulation will be improved. The second layer, which faces the component, generally has a plurality of cavities, due to acoustic and thermal reasons. In prior art, this would have required a comparably thick adhesive layer that hardly contributes to insulation. Due to the inventive mechanical non-adhesive connection, this is no longer required. Moreover, the improved thermal properties may be attributed to the fact that—other than in bonding the second layer to the component—pores present in the second layer are not sealed by an adhesive. It is also possible to attach multiple area-shaped mounting parts spread over the surface of the sandwich plate, e.g. by round or angular pads that are dimensioned to be only 1-10%, preferably 5% of the surface of the sandwich plate. 1-100, preferably 5-20 pads are sufficient for safe securing.

The first layer is in particular arranged on a side of the second layer that faces away from the component and especially is for sound deadening of the component and therefor preferably has a larger area density and/or a larger density than the second layer. The first and the second layer are preferably firmly or permanently, i.e. non-detachably, connected to each other.

According to the invention, by connecting the mounting part to the second layer especially a hook-and-pile or hook-and-loop (Velcro®-type) connection is produced. The engaging elements of the mounting part, which may also be referred to as hook-devices or hook elements, for this purpose especially are elements engaging behind, such as for example hooks and/or mushroom heads. The engaging elements are designed for producing a non-adhesive mechanical form-fitting connection between the second layer and the mounting part, by way of engaging behind structures of the second layer. Preferably, the engaging elements are formed such that a connection, which is as positionally stable as possible, i.e. an immobile connection, is produced. Nonetheless, the form-fitting connection forms a detachable connection, so that the plate part consisting of first and second layer as well as further layers, as required, may repeatedly be detached and attached from and to the mounting part. The detachable connection between the plate part and the mounting part offers the advantage that the plate part may be exchanged in a most simple manner and occasionally may be replaced by another one. In cooperating with each other, the mounting part and the second layer preferably form a hook-and-loop fastener, wherein the mounting part preferably forms a hook part and the second layer forms a loop part. Basically, a reverse arrangement is also conceivable.

An aspect according to the invention may be considered as the second layer of the sandwich plate concurrently forming an insulating layer and a part of a hook-and-loop fastener or hook fastener. For this, according to the invention, it is preferred that the second layer is formed of a fiber fabric, especially a non-woven or a non-woven fabric, respectively. One the one side, a non-woven fabric has good damping properties and on the other side, due to its plurality of random fibers, represents a suitable locking layer for the engaging elements or the form-fitting elements that engage behind.

In a preferred embodiment of the invention, attachment of the mounting part to the component to be acoustically improved is done by way of bonding. For this, the engaging elements preferably are provided at a first side of the mounting part and the mounting part is preferably provided with an adhesive layer at an opposite second side. The adhesive layer may especially be present in a full-area manner at the side of the mounting part facing the component, so that the mounting part is allowed to be mounted onto the component in a full-area manner. The mounting part may especially be provided with a self-adhesive backside. For a maximally thin adhesive layer the mounting part preferably has a largely smooth surface or backside, respectively.

In order prevent the adhesive layer from contacting the second layer of the sandwich plate the mounting part, between the engaging elements and the adhesive layer, preferably comprises an area-shaped element, for example a sheet or a fabric. The sheet (foil) or fabric, respectively, on its side opposite of the engaging elements, may be provided especially with an adhesive layer and preferably is impermeable to the adhesive of the adhesive layer. The engaging elements are arranged at the side of the area-shaped element facing the second layer.

In a preferred embodiment the mounting part is formed as a self-adhesive Velcro® tape or hook tape or as a self-adhesive Velcro® sheet or hook sheet. In this way, the mounting part is allowed to be attached in a most simple manner, without additional adhesive to be applied, to the component to be acoustically improved. The component prepared in this way then is allowed to be provided with the acoustically and thermally active plate part (especially first and second layer) in a most simple and fast manner.

In view of the thermal and acoustic properties, which are to be achieved, it may be of advantage that the mounting part extends in a full-area manner along the second layer, especially along the side of the second layer facing the component. The second layer of the sandwich plate then is allowed to be attached to the component in a full-area manner, and is allowed to be attached especially by full-area form-fitting connection, especially locking, between the second layer and the mounting part. In addition, full-area bonding of the mounting part may be provided on the component.

Alternatively, however, it may as well be advantageous, that the mounting part has individual, preferably equally distributed mounting strips and/or layer pieces. The mounting part consisting for example of a plurality of Velcro® tapes (hook tapes) allows for simple mounting, especially with a large-area sandwich plate, due to the reduced adhesive surface. Moreover, by way of specific arrangement of individual adhesive surfaces influence may be exerted on the acoustic properties.

In view of good sound deadening properties the first layer of the sandwich plate preferably is formed of a bitumen layer. The thickness of the bitumen layer preferably is maximally 2 mm, especially maximally 1 mm. The thickness of the second layer, which may also be referred to as thermal insulating layer preferably is larger than the thickness of the first layer and is preferably maximally 5 mm, in particular maximally 3 mm.

Basically, the overall sandwich plate may be a dimensionally stable plate. Preferably, the plate is embodied as a flexible, non-rigid plate and may basically be referred to as a sheet. The plate part of the sandwich plate preferably forms a unit of flexible layers, which are firmly connected to each other. The mounting part preferably is a flexible Velcro® or hook tape or Velcro® (hook) element, which may be detachably connected to the plate part.

BRIEF DESCRIPTION OF THE DRAWINGS

In the following the invention will be described in detail by way of an exemplary example, which is represented in the attached schematic drawing. Wherein the sole FIG. 1 shows a cross sectional view of a sandwich plate according to the invention.

DETAILED DESCRIPTION OF THE PREFERRED EMBODIMENTS

The sandwich plate 10 according to the invention comprises a sound dampening and thermal insulating plate part 11, which comprises a first, especially outer layer 12 as well as a second, especially inner layer 22. The first layer 12 essentially is for sound deadening of a component 40, to which the sandwich plate 10 is attached, and therefor is formed or consists of, respectively, a bitumen sheet or bitumen layer. The second layer 22, besides acoustic purposes, especially is for thermal insulation of the component 40 and is preferably formed of a non-woven material or consists thereof, respectively. For good thermal insulation the second layer 22 is provided with a plurality of cavities 28. It has lower density and/or lower area density than the first layer 12 and is elastic transversally to the areal extent of the sandwich plate 10 so that by combining the first layer 12 and second layer 22 a spring-and-mass system is formed. The first layer 12 preferably is, at least largely, devoid of pores.

The first layer 12 comprises a first side 14 facing the exterior and a second side 16 facing the component 40. The second layer 22 is firmly connected to the first layer 12 and comprises a first side 24 facing the exterior and facing toward the first layer 12 as well as a second side 26 facing the component 40.

The plate part 11 of the sandwich plate 10, formed of the first layer 12 and the second layer 22, is mounted to a surface 42 of the component 40 by means of a mounting part 30. The mounting part 30 is formed as a hook tape or Velcro® tape or as a hook or Velcro® sheet, respectively, and may especially be self-adhesive. The component 40 may especially be a metal sheet, which for example may formed of steel, aluminum and/or plastics.

The mounting element 30 comprises an area-shaped element 32, for example a fabric or a sheet having a first side 34 facing the second layer 22 and a second side 36 facing the component 40. At the first side 34 there is formed a plurality of hook-shaped engaging elements 38, which individually project from the element 32 and are formed such that they may lock into the non-woven material of the second layer 22 (insulating layer) of the sandwich plate 10 to retain the mounting element 30 to the second layer 22 in a positionally firm manner. The engaging elements 38 especially are formed as Velcro® devices, for example as Velcro® hooks or Velcro® loops, and engaging behind the fiber structures of the non-woven material. At its second side 36 adjacent to the component 40 the mounting element 30 is provided with an adhesive layer for adherence of the mounting element 30 onto the surface 42 of the component 40. The first side 34 is devoid of adhesive.

According to the invention, a sandwich plate 10 is provided, which, due to a sandwich design, combines sound deadening properties and sound dampening properties with the thermal insulating properties, wherein, by the mounting part 30 according to the invention, the acoustic properties may be improved with thermal properties being consistent, or the thermal properties may be improved with acoustic properties being consistent, respectively. The sandwich plate 10 according to the invention is especially suitable for utilization in dish washers, which put high requirements both in acoustics and thermal insulation.

LIST OF REFERENCE NUMBERS

10 Sandwich plate
11 Plate part
12 First layer
14 First side
16 Second side
22 Second layer
24 First side
26 Second side
28 Cavity
30 Mounting part
32 Area-shape element
34 First side
36 Second side
38 Engaging elements
40 Component
42 Surface

The invention claimed is as follows:

1. A sound absorbing sandwich plate for attaching to a component, comprising:
   a spring-and-mass arrangement, comprising:
      a first layer comprising a bitumen layer, wherein the first layer has a thickness of less than or equal to 2 mm; and
      a second layer connected to the first layer, wherein the second layer has a thickness that is greater than the thickness of the first layer and less than or equal to 5 mm; and
   at least one mounting part at least partially provided along the second layer in an areal manner, the at least one mounting part having a plurality of engaging elements which are configured to engage into the second layer, wherein the sandwich plate is a flexible, non-rigid plate, wherein the second layer is elastic transversally to an areal extent of the sandwich plate such that the first and second layers from the spring-and-mass arrangement.

2. The sandwich plate according to claim 1, wherein the engaging elements comprise elements that engage behind portions of the second layer.

3. The sandwich plate according to claim 2, wherein the engaging elements include at least one of hooks and mushroom heads.

4. The sandwich plate according to claim 2, wherein the second layer comprises a non-woven material.

5. The sandwich plate according to claim 4, wherein the engaging elements are provided at a first side of the mounting part and wherein the at least one mounting part includes an adhesive layer on an opposite second side.

6. The sandwich plate according to claim 5, wherein the at least one mounting part comprises at least one of a self-adhesive hook tape and a self-adhesive hook sheet.

7. The sandwich plate according to claim 6, wherein the at least one mounting part includes at least one of individual mounting strips and layer pieces.

8. The sandwich plate according to claim 1, wherein the second layer comprises a non-woven material.

9. The sandwich plate according to claim 1, wherein the engaging elements are provided at a first side of the at least one mounting part and wherein the at least one mounting part includes an adhesive layer on an opposite second side.

10. The sandwich plate according to claim 1, wherein the at least one mounting part comprises at least one of a self-adhesive hook tape and a self-adhesive hook sheet.

11. The sandwich plate according to claim 1, wherein the mounting part includes at least one of individual mounting strips and layer pieces.

12. The sandwich plate according to claim 1, wherein the at least one mounting part includes multiple mounting parts, and wherein the multiple mounting parts cover between about 1% and 10% of a surface of the sandwich plate.

13. The sandwich plate according to claim 12, wherein the multiple mounting parts cover about 5% of the surface of the sandwich plate.

14. The sandwich plate according to claim 1, wherein the second layer is permanently connected to the first layer.

15. The sandwich plate according to clime 1, wherein the second layer is a thermal insulating layer.

16. The sandwich plate according to claim 15, wherein the second layer includes a plurality of cavities.

17. The sandwich plate according to claim 1, wherein the second layer includes a plurality of cavities.

* * * * *